UNITED STATES PATENT OFFICE.

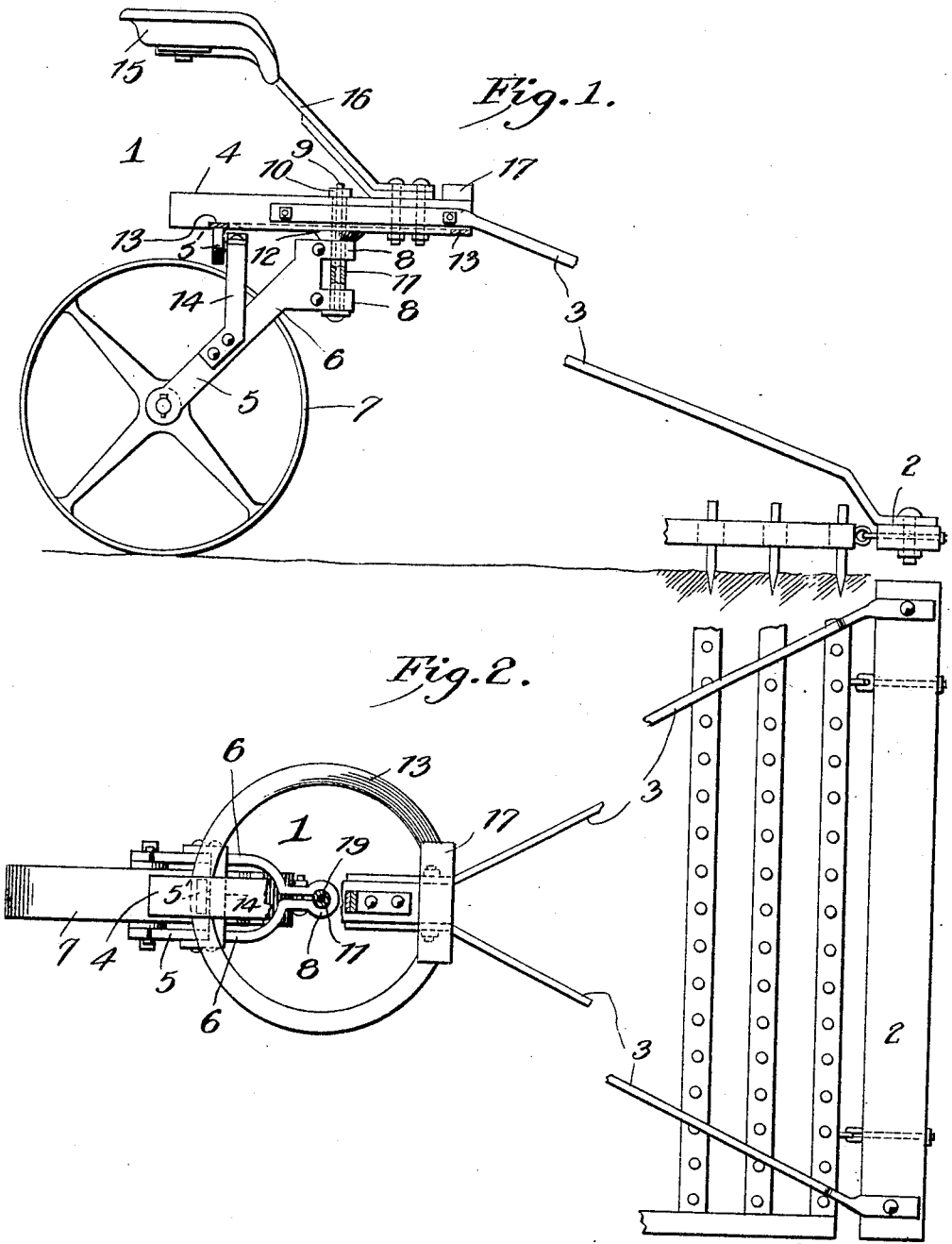

JOHN F. BROWNLEE, OF HEPBURN, IOWA.

HARROW ATTACHMENT.

No. 904,754.　　　　Specification of Letters Patent.　　　　Patented Nov. 24, 1908.

Application filed July 20, 1908. Serial No. 444,352.

*To all whom it may concern:*

Be it known that I, JOHN F. BROWNLEE, a citizen of the United States, residing at Hepburn, in the county of Page and State of Iowa, have invented certain new and useful Improvements in Harrow Attachments; and I do declare the following to be a full, clear, and exact description of the invention, such as will enable others skilled in the art to which it appertains to make and use the same.

This invention relates to new and useful improvements in riding attachments for harrows or other farming implements and has for its object to provide a simple attachment whereby the operator is enabled to ride in rear of the harrow of the attachment instead of walking as is at present the case.

With these and other objects in view, the invention consists of certain novel features of construction, combination and arrangement of parts, as will be more fully described and particularly pointed out in the appended claims.

In the accompanying drawings, Figure 1 is a side elevation of the attachment applied to the harrow, with parts broken away; and Fig. 2 is a plan view thereof.

In the embodiment illustrated the attachment 1 is attached to the cross beam 2 of the harrow, by means of a pair of rearwardly inclined converging connecting bars 3 attached at their forward ends to opposite ends of the harrow beam, and at their rear ends to opposite faces of the platform 4 of the attachment, which as shown, is of approximately rectangular form. This platform is mounted upon a suitable support 5 comprising a pair of forwardly inclined flat side pieces 6 between the lower ends of which is mounted a supporting wheel 7, the upper end of the support 5 being formed with a pair of vertically spaced loops 8, the purpose of which will be disclosed. The upper end of the support is pivoted or swiveled to the platform by a fastening bolt 9 which extends upwardly through the looped portions 8 and the platform, a nut 10 screwing upon the upper end of said bolt against the face of the latter. Before placing this bolt in position, however, a tubular roller 11 of cylindrical form is inserted through the looped portions of the support and the platform and a collar or washer 12 interposed between the upper eyed portion of the support and the under surface of the platform around said roller. An annular bearing plate 13 is mounted in arc-shaped grooves in the under surface of the platform and bears upon a roller 5' suitably mounted at the central portion of a brace 14 of approximately inverted U-shaped form, the ends of which are riveted or otherwise attached to the outer faces of the side pieces of the support 5. A seat 15 is arranged at the upper end of a suitable seat support 16, bolted upon the platform 4. A foot rest 17 is also bolted upon the front end of the platform in front of the seat support.

From the foregoing description it will be seen that the attachment is of such construction as to insure easy riding and that the same may be readily attached to a harrow or other farming implement of like character, and provide means whereby the operator may ride in rear of said implement instead of walking as is now the case.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described and ascertained the nature of my invention, what I claim as new and desire to secure by Letters-Patent, is:—

1. An attachment of the class described comprising a forwardly inclined platform support provided with a pair of vertically spaced looped portions, a platform revolubly mounted upon the support, a fastening bolt extending through the loops of the support and platform, a nut screwing upon the upper end of said bolt, a collar interposed between the upper loop of the support and platform and around said fastening bolt, a supporting wheel mounted in the support beneath the platform, and means for attaching the attachment to a farming implement.

2. An attachment of the class described comprising a forwardly inclined support, a platform revolubly mounted upon said support, a supporting wheel journaled in the support beneath the platform, a circular bearing plate mounted in the under surface of the platform, a roller for the bearing plate to bear and turn upon, and means for attaching the attachment to a farming implement.

3. An attachment of the class described comprising a forwardly inclined support comprising spaced side pieces and a pair of vertically spaced looped portions, a relatively narrow platform revolubly mounted between its ends upon said support, a fastening bolt extending through the looped portions of the support and the platform, a tubular roller around said bolt, and a collar interposed between the upper looped portion of the support and the platform and around said roller.

4. An attachment of the class described comprising a forwardly inclined support comprising spaced side pieces and a pair of vertically spaced looped portions, a relatively narrow platform revolubly mounted between its ends upon the support, a fastening bolt extending through the looped portions of the support and the platform, a tubular roller around said bolt, a collar interposed between the upper looped portion of the support and the platform and around said roller, a circular bearing plate mounted in the under surface of the platform, and a roller for the bearing plate to turn upon.

In testimony whereof I have hereunto set my hand in presence of two subscribing witnesses.

JOHN F. BROWNLEE.

Witnesses:
  S. EDENFIELD,
  J. A. SWANSON.